Patented Jan. 11, 1938

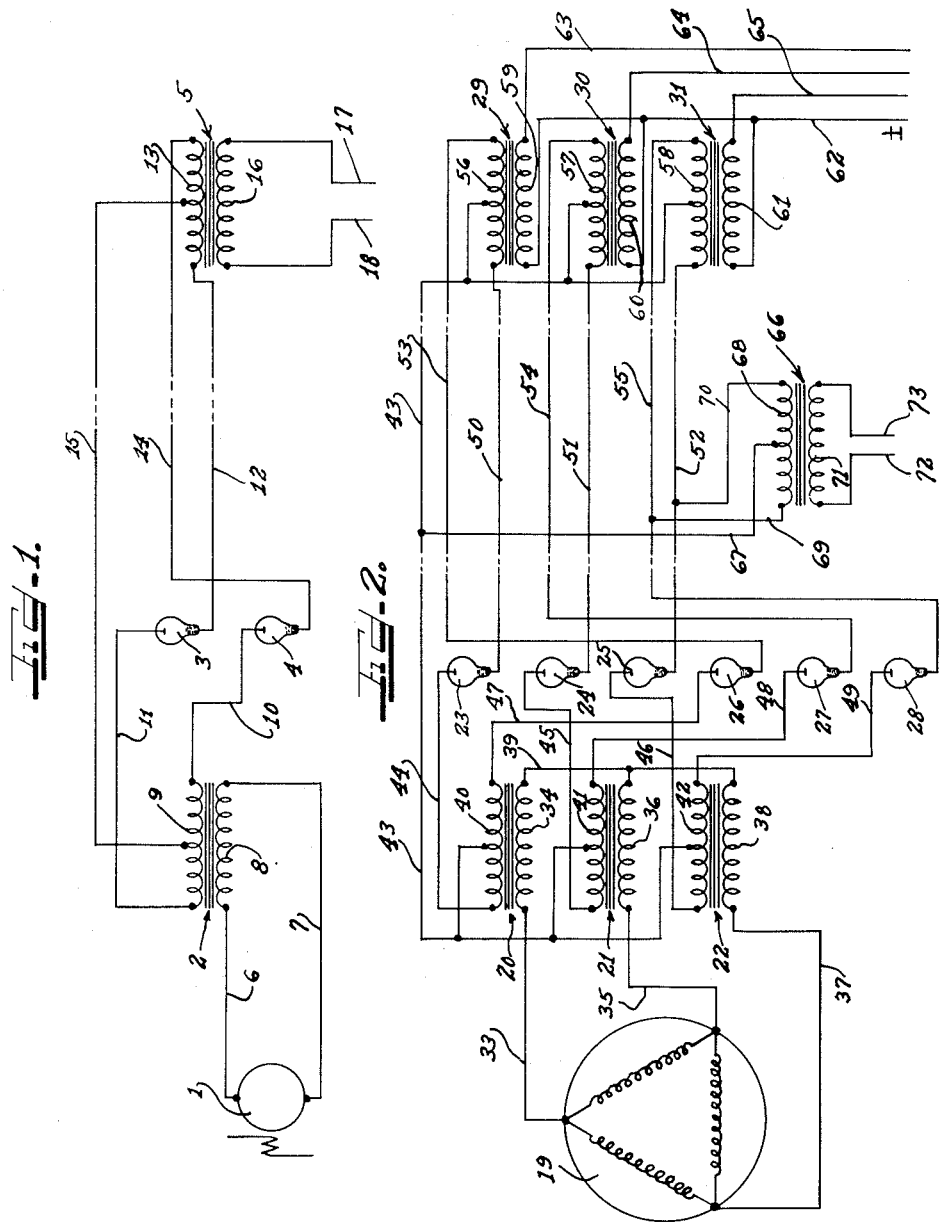

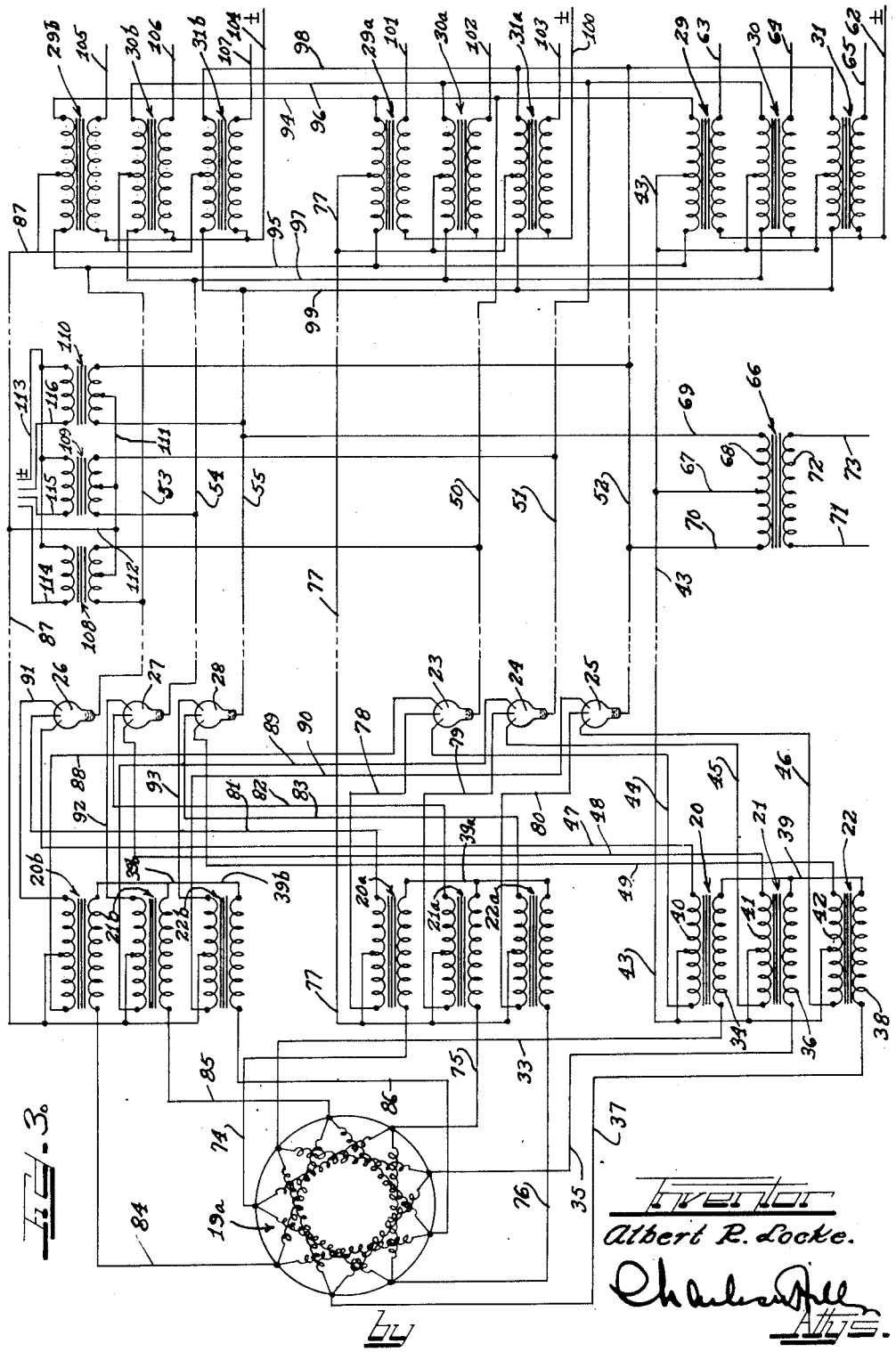

2,105,194

UNITED STATES PATENT OFFICE 2,105,194

SYSTEM FOR TRANSMITTING ELECTRICAL ENERGY

Albert R. Locke, Oak Park, Ill.

Application August 8, 1935, Serial No. 35,311
Renewed November 24, 1937

16 Claims. (Cl. 171—97)

This invention relates to improvements in a method of and system for transmitting electrical energy, the invention being highly desirable for high tension cross-country transmission of direct current over substantially any feasible distance, although the invention will have other uses and purposes as will be apparent to one skilled in the art, including transmission over short distances.

The present invention is especially adaptable for the transmission of large amounts of power over long distances from points of generation to large centers of distribution.

At the present time, practically all of such power transmission systems in operation carry alternating current in the transmission lines. With the use of this invention, direct current is carried in the transmission lines, thereby eliminating many of the losses and equipment expense occurring with the transmission of alternating current.

It is well known that with the transmission of alternating current, especially in high tension ong-distance lines, objectionable losses occur, and in many cases objectionably expensive equipment must be used. These losses include corona, so-called skin effect, and capacity currents between the lines.

Accordingly, it is an object of the present invention to provide a system for the transmission of direct current, which system eliminates substantially all of the losses to which the transmission of alternating current is subject, with the exception, of course, of the resistance or so-called IR drop.

Another object of the present invention is the provision of a system for the transmission of direct current wherein the transmission lines may be disposed substantially as closely together as may be desired within the realms of mechanical feasibility.

Still another object of this invention is the provision of a system for transmitting electrical energy wherein the voltage of a system may be stepped up at the input end of the system, direct current is transmitted over substantially any desirable distance, and then the transmitted direct current may be transformed into alternating current, of substantially any desired voltage, for distribution purposes.

Still a further object of this invention is the provision of a system for the transmission of direct current in an efficient and economical manner, the system using less conductor material than a system equivalent in power but transmitting alternating current.

Also an object of this invention is the provision of an electrical energy transmission system wherein current from an alternating current source of supply may be rectified and transmitted as direct current over substantially any distance, and the transmitted direct current then transformed into alternating current of substantially any desired voltage for distribution purposes.

It is also a feature of this invention to provide an electrical energy transmitting system wherein direct current is transmitted over the lines from the point of generation to the center of distribution, and wherein the lines may be tapped at any desirable location for the purpose of supplying energy to a town or other similar load center.

Still another object of this invention is the provision of a system for the transmission of direct current, which system is adapted to deliver alternating current at the distribution end thereof, and in which the transmission lines may be tapped at any desirable point for the supply of alternating current to a small town or other load center.

In general, a system embodying improvements of the present invention will utilize proper means and circuit connections to include an alternating current source, the transmission of direct current and the distribution of alternating current. Current is supplied from the alternating current source in substantially any desired number of phases, and the voltage is preferably initially stepped up by transformers to the desired amount for transmission purposes. The alternating current is rectified into pulsating direct current, substantially half the current wave being transmitted over one line and the other half of the current wave being transmitted over another line.

At the distribution end of the system, the transmitted half current waves are united and transformed into a substantially full wave alternating current, of substantially any desirable voltage, for distribution purposes. The entire system is very flexible and can be readily adapted for the combination of substantially any desired number of phases, and the distribution end of the line may likewise be arranged for power distribution in single or multi-phase. For example, if a nine-phase system is utilized, three separate four-wire three-phase distribution systems may be had and single-phase taps may be made where desired.

In general, the system includes a suitable energy source at the input end, a bank of transformers, a bank of rectifiers, preferably mercury arc rectifiers, transmission lines, and a bank of transformers at the distribution end of the transmission lines. It is not necessary with this system to utilize any rectifiers at the distribution end of the system. The connections are so made that if, for example, a sine wave alternating current is produced by the generating means, some of the rectifiers will pass substantially half of the sine waves in the transmission lines, wherein the current will be carried as pulsating direct current. The other half of the waves will be passed into other lines by the rest of the rectifiers and likewise be transmitted as pulsating direct current. In most cases, these half wave currents will be of opposite polarity, and by feeding these half wave currents into opposite ends of the primary winding of a transformer at the distribution end, full wave alternating current may be distributed from the secondary of that transformer.

Of course, the present system may be equally as well utilized with a suitable form of pulsating direct current generator at the input end, if so desired.

The present system, as above explained in general, provides many distinct advantages, among which may be mentioned the fact that standard equipment already in use in transmission systems may be utilized with this system, although in some instances it may be desired to provide a heavier winding on the secondaries of the step-up transformers at the input end of the system for an added safety factor in the event of short circuits; and the transmission lines can be carried in a single cable, if so desired.

Of course, the present invention involves a new and novel method of transmitting electrical energy, and it is believed that this method will be sufficiently apparent from the foregoing as well as the specific description of the circuit connection for the system given hereinafter.

While some of the more salient features, characteristics and advances of the present invention have been above pointed out, others will become apparent from the following disclosures.

Several wiring diagrams illustrating the flexibility of the system are shown in the accompanying drawings, wherein:

Figure 1 is a wiring diagram of a simple single-phase transmission system embodying principles of the present invention.

Figure 2 is a wiring diagram of a three-phase transmission system embodying principles of the present invention.

Figure 3 is a wiring diagram of a nine-phase transmission system embodying principles of the present invention, and illustrating how the transmission lines may be tapped to provide either single-phase or three-phase distribution for points midway between the generating station and the distributing end of the system.

As shown on the drawings:

A simple single-phase transmission system is illustrated in Figure 1, and I am aware that while this is an operable system, it will not be utilized commercially to any great extent because from a practical point of view it is somewhat inefficient in that the current-carrying capacity of the line conductors is not utilized to as high an extent as is deemed desirable. However, the showing in Figure 1 clearly illustrates certain principles of my invention and is highly advantageous herein to render the system shown in Figure 3 more readily understandable.

With reference now to Figure 1, it will be seen that the apparatus involved in the system shown in this figure, with the exception of the conductors, includes an alternating current generator 1, a transformer generally indicated by the numeral 2, a pair of mercury arc rectifiers 3 and 4, respectively, at the input end of the transmission system, and a transformer generally indicated by numeral 5 at the output or distribution end of the system.

The terminals of the generator 1 are connected through conductors 6 and 7 to opposite ends of a primary winding 8 of the transformer 2. The secondary winding 9 of this transformer is connected at one end thereof through a conductor 10 to the rectifier 4, and at the other end thereof through a conductor 11 to the rectifier 3. From the rectifier 3 a transmission line conductor 12 leads to one end of the primary winding 13 of the transformer 5 at the distribution end of the system. Likewise, a transmission line conductor 14 establishes connection between the other rectifier 4 and the opposite end of the primary winding 13 of the transformer 5. A third transmission line conductor 15 is connected at one end to the midpoint of the secondary winding 9 of the transformer 2 and at the other end to the midpoint of the primary winding 13 of the transformer 5. The transmission lines are shown with dotted gaps to indicate the fact that they can be of various lengths.

The secondary winding 9 of the transformer 2 may be two separate windings with like ends thereof connected together, or may be a single winding having a central tap leading therefrom. Of course, in the event two separate windings are used, the open ends thereof may be connected together through any standard stabilizing arrangement, if so desired, and the line 15 will lead away from the stabilizer.

In operation, assuming for the purpose of convenience and clarity that the alternator 1 produces a sine wave alternating current, the generated current will pass through the primary 8 of the transformer 2. This transformer steps up the voltage on the system to a desired extent for transmission purposes. Accordingly, a sine wave alternating current will be produced in the secondary 9 of the transformer. Bearing in mind that the secondary 9 is connected at its midpoint to the midpoint of the primary 13 by a line conductor 15, it will be apparent that substantially half of the sine wave current will be passed by the rectifier 3 into the transmission line conductor 12 and carried over this line in the form of pulsating direct current. Likewise, the other half of the sine wave current from the secondary 9, which in this instance will be of opposite polarity to the first half, will be passed by the rectifier 4 into the transmission line conductor 14 and travel over this conductor in the form of pulsating direct current. Thus, it will be seen that the full sine wave of the alternating current is utilized in the system.

At the distribution end of the system, the line conductor 12 will feed pulsating direct current into one end of the primary 13 of the transformer 5, and the line conductor 14 will feed pulsating direct current of opposite polarity into the opposite end of the same primary 13. Therefore, substantially a full sine wave alternating current will be produced in the secondary 16 of the transformer 5 which may be distributed through distribution conductors 17 and 18, respectively, to any suitable load. The transformer 5 is preferably a step-down transformer, and the alternating current distributed through the lines 17 and 18 will therefore be of any desirable voltage for consumption. The load supplied by the lines 17 and 18 may be any desirable kind or character of load requiring single-phase alterating current.

In the event one of the line conductors 12 or 14 is opened, or one of the rectifiers 3 or 4 is cut off, the system will still function so that current may be supplied through the distributing lines 17 and 18 under the major portion of the intended voltage. For example, if it is intended that the voltage across the distributing lines 17 and 18 should be 110, and one of the power lines 12 or 14 is cut off, the voltage across the lines 17 and 18 will be in the neighborhood of 85.

In addition, it will be apparent that the system shown in Figure 1 can be short-circuited at substantially any point beyond the rectifiers without any damage to the system, since the rectifiers adequately protect the circuit against short-circuits.

From the foregoing, it will be apparent that in the operation of the present invention, an alternating current may be said to be split up into different wave portions, and these different wave portions transmitted in the form of pulsating direct current by different lines, and at the distribution end the wave portions so transmitted are reunited to furnish substantially full wave alternating current for distribution to a load.

In Figure 2, I have illustrated how the system of Figure 1 may be amplified into a three-phase system. In this instance, the apparatus used includes a three-phase generator 19, three transformers 20, 21 and 22, respectively, each of the same character as the transformer 2 previously described, and six mercury arc rectifiers 23, 24, 25, 26, 27 and 28, respectively, at the input end of the system. At the output end, the system includes three transformers 29, 30 and 31, respectively, of the same character as the transformer 5 previously described herein.

The three-phase generator 19 may be either star or delta, and the input bank of transformers (20, 21 and 22) are arranged in either delta or star, preferably the opposite arrangement to that of the generator so as to insure keeping the system always in balance. The transformer bank at the distribution end of the line (29, 30 and 31) may be arranged in either star or delta, as may be desired.

In this instance, the generator 19 is shown delta connected, and the input transformer bank arranged in star. One terminal of the generator is connected through a conductor 33 to a primary winding 34 of the transformer 20, another terminal through a conductor 35 to a primary winding 36 of the transformer 21, and the third terminal through a conductor 37 to a primary winding 38 of the transformer 22. The opposite ends of the primary windings 34, 36 and 38 are interconnected by a conductor 39 to provide the aforesaid star arrangement. The secondary windings 40, 41 and 42 of the transformers 20, 21 and 22, respectively, are each centrally tapped and connected to the same line conductor 43 which in this instance is the so-called neutral of a multi-phase system. One end of the secondary 40 is connected through a conductor 44 to the rectifier 23, one end of the secondary 41 is connected through a conductor 45 to the rectifier 24, and one end of the secondary 42 is connected through a conductor 46 to the rectifier 25. In like manner, the other ends of these secondaries are connected through conductors 47, 48 and 49 to rectifiers 26, 27 and 28, respectively.

Transmission line conductors 50, 51, 52, 53, 54 and 55 extend from the rectifiers 23, 24, 25, 26, 27 and 28. At the distribution end of the system, the neutral line 43 is connected to the mid-point of each of the primary windings 56, 57 and 58 of transformers 29, 30 and 31, respectively. Transmission line conductors 50, 51 and 52 are each connected to one end of the primaries 56, 57 and 58, respectively, and transmission line conductors 53, 54 and 55 are each connected to the other end of the primaries 56, 57 and 58, respectively.

The secondaries 59, 60 and 61 of the transformers 29, 30 and 31, respectively, are interconnected at one end thereof by distribution line conductor 62 which is the neutral conductor of a four-wire three-phase distribution line. The other three wires 63, 64 and 65 of the distribution line lead from the other ends of the secondaries 59, 60 and 61, respectively.

Except for the added phases, the operation of the hook-up of Figure 2 is substantially the same as that of Figure 1. The generator feeds the primary windings of the transformers 20, 21 and 22. Half the current waves produced in the secondaries of these transformers are passed by rectifiers 23, 24 and 25 in the form of pulsating direct current over the transmission lines 50, 51 and 52. The other half waves are passed by rectifiers 26, 27 and 28 in the form of pulsating direct current over transmission lines 53, 54 and 55.

At the distribution end, line conductors 50, 51 and 52 feed like ends of primaries 56, 57 and 58, and conductors 53, 54 and 55 feed the opposite ends of the same primaries. Accordingly, full wave alternating current is produced in each of the secondaries 59, 60 and 61, and three-phase alternating current may be distributed by the lines 63, 64 and 65, and neutral 62.

In Figure 2, I have also shown how the transmission line conductors may be tapped at any point therealong to supply a small town or other load. In this instance, a transformer 66 is utilized which is of the same general character as all of the transformers previously mentioned herein. A tap conductor 67 leads from the neutral 43 to the mid-point of the primary 68 of this transformer 66. Likewise, opposite ends of the primary 68 are connected through tap conductors 69 and 70 to transmission line conductors 55 and 52, respectively. It will be noted that line conductors 55 and 52 are each carrying pulsating direct current of opposite polarities. Accordingly, full wave alternating current is produced in the secondary 71 of the transformer 66, and this current stepped down to a desired voltage by the transformer 66 is distributed to the load over lines 72 and 73. It is immaterial whether tap conductors 69 and 70 are associated with line conductors 52 and 55, or with line conductors 51 and 54, or with the line conductors 50 and 53. However, if more than one tapped supply is established, it is preferable to evenly distribute the tapped supply over different pairs of line conductors. In this instance, a single-phase tap has been shown, but by suitable amplification in the set-up, a three-phase tap may also be established.

In the hook-up shown in Figures 1 and 2, the transmission line conductors are not utilized to near their full capacity. However, the three-phase system of Figure 2 may be amplified so as to increase the current carried by the main transmission line conductors. These conductors carry pulsating direct current and so must be of sufficient size to adequately carry the full amplitude of the wave portion. However, only in spaced intervals does the full amplitude of the wave portion occur. By imposing other similar wave portions upon the wire out of phase with each other, the full amplitude of the wave portions will be reached at more frequent intervals, and the line conductors will be utilized nearer to their current bearing capacity.

In Figure 3, I have illustrated a nine-phase system, which is highly efficient in character for high tension long-distance power transmission. Each of the main line conductors in the system of Figure 3 carries three times the load of the corresponding main line conductors of the system of Figure 2, assuming the voltages on the input transformers are the same.

Since each three-phase portion of the hook-up of Figure 3 taken by itself is identical in character and connections with the hook-up of Figure 2, for the purpose of brevity herein, the same numbers utilized in Figure 2 will be utilized for the lower three-wire section of the nine-phase system of Figure 3, and the above description in connection with the showing in Figure 2 applies to the lower three-wire arrangement in the hook-up of Figure 3. In this nine-phase system, only six mercury arc rectifiers are used, and these rectifiers are numbered the same as in Figure 2. The only difference in the arrangement between Figure 3 and Figure 2 is in the fact that the mercury arc rectifiers are shown in inverse order, namely, with the rectifiers 26, 27 and 28 being disposed above the rectifiers 23, 24 and 25, in the drawings.

With reference to Figure 3, it will be seen that with the nine-phase system, three transformer banks of three each are utilized, each bank being identical in construction and arrangement. One bank includes the transformers 20, 21 and 22 connected in identically the same manner and arrangement as above described in connection with Figure 2, another bank includes the transformers 20a, 21a and 22a, and a third bank includes the transformers 20b, 21b and 22b. Even with the three transformer banks of three transformers each, only the same six mercury arc rectifiers are utilized. Each rectifier has connected thereto one end of the secondaries from corresponding transformers in each of the three banks, and transmission line conductors 50, 51, 52, 53, 54 and 55 lead away from the rectifiers 23, 24, 25, 26, 27 and 28, respectively.

In this instance, generating means 19a are shown which may be either a single nine-phase generator or three three-phase generators coupled together in a manner to provide nine-phase generation. From three terminals of the generator 19a, conductors 33, 35 and 37 lead respectively to the primaries of transformers 20, 21 and 22 as above described in connection with Figure 2. The secondaries of these transformers are connected as aforesaid to the respective mercury arc rectifiers to provide pulsating direct current in each of the transmission line conductors. A second set of three terminals of the generator are connected through conductors 74, 75 and 76 to corresponding ends of the primaries of the transformers 20a, 21a and 22a, respectively, the opposite ends of these primaries being interconnected by a conductor 39a. The secondaries of the transformers 20a, 21a and 22a are centrally tapped by a neutral line conductor 77. Like ends of these secondaries are also connected by conductors 78, 79 and 80, respectively, to the rectifiers 23, 24 and 25, respectively. Opposite ends of these secondaries are connected by conductors 81, 82 and 83 to rectifiers 26, 27 and 28, respectively.

In similar manner, the other three generator terminals are connected through conductors 84, 85 and 86 to like ends of the primaries of transformers 20b, 21b and 22b, respectively. Opposite ends of these primaries are interconnected by conductor 39b. The secondaries of the transformers 20b, 21b and 22b are centrally tapped by a neutral line conductor 87. Like ends of these secondaries are also connected by conductors 88, 89 and 90 to rectifiers 23, 24 and 25, respectively. Opposite ends of these secondaries are connected by conductors 91, 92, and 93 to the rectifiers 26, 27 and 28, respectively.

It will therefore be apparent that each rectifier passes into its corresponding transmission line conductor three separate wave portions out of phase with each other. For example, rectifier 23 will pass three wave portions from the secondaries of transformers 20, 20a and 20b into the transmission line conductor 50, while the wave portions of opposite polarity from these same secondaries will be passed into transmission line conductor 53 by the rectifier 26. In this manner, it will be seen that the transmission line conductors are carrying three times the amount of current that the same transmission line conductors carry in the arrangement shown in Figure 2, assuming other conditions the same. It is very significant to note, however, that while the arrangement in Figure 3 transmits a considerably greater amount of power than the arrangement of Figure 2, the transmission lines have only been increased in number by the addition of the two neutrals 77 and 87.

At the distribution end of the system, it is only necessary to utilize three transformer banks of three each. One of these banks contains transformers 29, 30 and 31, another bank contains transformers 29a, 30a and 31a, and the third bank contains transformers 29b, 30b and 31b, all transformers being identical in character. At this end of the system, each of the main transmission line conductors 50 through 55 is connected to a transformer in each of the groups. The main line conductor 50 is connected through conductor 94 to like ends of the primaries of transformers 29, 29a and 29b. The opposite ends of these primaries are interconnected through conductor 95 to the main line conductor 53. The main transmission line conductor 51 is connected through a conductor 96 to like ends of the primaries of transformers 30, 30a and 30b. The opposite ends of these primaries are interconnected through a conductor 97 to the main transmission line conductor 54. The main transmission line conductor 52 is connected through a conductor 98 to like ends of the primaries of transformers 31, 31a and 31b, while the opposite ends of these primaries are interconnected through a conductor 99 to the main transmission line conductor 55.

The neutral points of the primaries of the transformers 29, 30 and 31 are interconnected by the neutral line conductor 43, and in similar manner, neutral points of the primaries in the other banks are interconnected through neutral line conductors 77 and 87, respectively.

As in the previous description of operation, it will be seen that the secondaries of all the transformers at the distribution end of the system will be supplied with substantially full wave alternating current. The first transformer bank, including transformers 29, 30 and 31 provides a four-wire three-phase distribution line including the neutral 62 interconnecting like ends of the secondaries of these transformers, and supply lines 63, 64 and 65, respectively, run from each opposite end of the secondaries. In like manner, the second bank of transformers, including transformers 29a, 30a and 31a provides a four-wire three-phase distribution supply line including the neutral 100 and the individual supply lines 101, 102 and 103. Also in similar manner, the third bank of transformers 29b, 30b and 31b provides another four-wire three-phase supply circuit including a neutral 104 and supply lines 105, 106 and 107.

Obviously, the three separate three-phase supply circuits need not furnish power to the same load or same load locality. Each of these supply circuits may supply a different town or city than the other supply circuits, depending upon whatever arrangement is deemed desirable. Likewise, the same center of distribution, or the same load, may be supplied with like power from transmission systems emanating from different generative sources, which generative sources may be in different locations or various distances apart.

Also, in Figure 3 I have shown how a single-phase alternating current supply may be tapped off from the transmission line conductor at any desirable point along the system through a step-down transformer 66, as explained hereinabove in connection with the showing in Figure 2. In this figure, I have also indicated how a three-phase four-wire alternating current supply may be tapped off the line conductors at any desirable point along the transmission system. In this instance, three transformers 108, 109 and 110 are utilized, these transformers being of like character to those previously mentioned herein. The mid-points of the primaries of these transformers are interconnected through a conductor 111 and this conductor is in turn connected through a conductor 112 to the neutral line conductor 87. Opposite ends of the primary of the transformer 108 are connected to transmission line conductors 50 and 53, respectively, the primary of transformer 109 to line conductors 51 and 54, and the primary of transformer 110 to line conductors 52 and 55. The transformers 108, 109 and 110 step down the voltage to a desired value and the three-phase supply circuit includes a neutral 113 which interconnects like ends of the secondaries of these transformers, and supply lines 114, 115 and 116 from the opposite ends of the secondaries.

In the event it is desired to tap the transmission line conductors to provide another intermediate three-phase supply circuit, it is preferable to utilize one of the other two neutral line conductors 43 or 77 so that the system may be kept in balance.

From the foregoing, it is apparent that I have provided a new and novel method of transmitting electrical energy, and further that I have provided a system for the transmission of electrical energy in the form of pulsating direct current in an easy and highly efficient manner with the use of very simple circuits. The system herein set forth is practically efficient for commercial usage and results in an elimination of a substantial part of the losses contingent with the transmission of alternating current, with the exception, of course, of the resistance drop. Further, the system eliminates a considerable portion of equipment expense contingent with the transmission of alternating current and the transmission line conductors may be utilized to a greater capacity than with the alternating current system. In comparison with transmission systems now in use, this invention may be installed and operated very economically.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:

1. A constant potential transmission system comprising a source of polyphase alternating current, a polyphase alternating current distributing system, a plurality of single phase static transformers having their secondaries connected to said distributing system to supply said distributing system with polyphase alternating current, and means connecting said source and the primaries of said transformers to supply said primaries with polyphase uni-directional pulsating currents.

2. A constant potential transmission system comprising a source of polyphase alternating current, a plurality of transmission circuits, and means connected to and interposed between said source and said transmission circuits to supply said circuits with polyphase uni-directional pulsating currents.

3. A constant potential transmission system comprising a static transformer having a secondary winding and having a primary winding provided with a center tap and a pair of end connections, one at each end of said primary winding, and means connected to said center tap and to said end connections and supplying said primary winding with polyphase pulsating uni-directional currents so that single phase alternating current is available at the terminals of said secondary winding.

4. In combination, a source of polyphase pulsating uni-directional currents, static means to convert said polyphase uni-directional currents into polyphase alternating currents for supplying a polyphase alternating current system, said means comprising a plurality of static transformers each having a secondary winding connected to a polyphase alternating current distributing system, and each having a primary winding provided with a center tap and end connections connected to said source.

5. In combination, a polyphase alternating current source, means to convert polyphase alternating currents into polyphase half-wave uni-directional currents, and a transmission system connected to said means.

6. In combination, a source of polyphase half-wave uni-directional currents, a transmission system connected to said source and comprising a plurality of transmission lines, and static transformer means connected to said transmission system and arranged to supply polyphase alternating currents.

7. A source of constant potential comprising a single phase static transformer having a secondary winding to supply single phase alternating current, and having a primary winding provided with end connections and a center tap, and means connected to said tap and said end connections to supply said primary winding with half-wave polyphase uni-directional currents.

8. A constant potential transmission system comprising a single phase source having a pair of end terminals providing voltages of opposite polarity and a mid-point terminal or neutral, a three-wire transmission system connected to said terminals to provide a pair of outer legs and a neutral, a half-wave rectifier interposed in each of said outer legs and adjacent their connection to said source, and a static transformer having its primary connected to the three wires of the transmission system and adapted to supply single phase current from its secondary.

9. A constant potential system comprising a three-wire transmission system providing a pair of outer legs and a neutral connected to means impressing pulsating unidirectional voltages of opposite polarity on said outer legs and providing a neutral or mid-point intermediate terminals providing alternating voltages of opposite polarity, and static transformer means to provide a single phase source of voltage inductively coupled to said three-wire transmission system.

10. A constant potential system comprising a three phase source of energy, a three phase distributing system fed by static transformers, a seven-wire transmission system connecting said source and said transformers, one of said wires being a neutral wire, six of said wires having each a half-wave rectifier interposed between it and its connection to said source, and adjacent said source, whereby said transmission system is supplied with polyphase unidirectional currents.

11. A constant potential transmission system comprising a polyphase source of energy at the transmitting end of the system, static transformers connected providing a polyphase source of voltage at the receiving end of the system, transmission lines connecting the source at the transmitting end to said transformers, and half-wave rectifier means interposed in certain of said transmission lines and adjacent their connection to the source at the transmitting end to provide polyphase unidirectional currents for transmission to said transformers.

12. In combination, poly-phase alternating current source, means to convert poly-phase alternating current into poly-phase half-wave uni-directional current, a transmission system connected to said means comprising a plurality of transmission lines, and static transformer means connected to said transmisison system and arranged to supply poly-phase alternating current.

13. In an electric power transmission and distribution system, the method of transmitting electric energy which includes deriving from a source of poly-phase alternating current a plurality of uni-directional pulsations of different time sequence, transmitting the pulsations of different time sequence over individual conducting paths, selectively combining said pulsations of different time sequence at the load end of the transmission line, and returning said pulsations of different time sequence over a common path.

14. In an electric power transmission and distribution system, the method of transmitting electric energy which includes deriving from a source of poly-phase alternating current a plurality of uni-directional pulses which bear a different phase sequence with respect to each other, transmitting the pulses of different phase over individual circuits forming a transmission line, and selectively combining said pulses of different phase in a manner to invert them to their original state.

15. An electric power transmission system comprising a source of poly-phase alternating current, a transmission line including a plurality of outgoing conductors and a single return conductor, means connected to said source for converting poly-phase alternating current into poly-phase uni-directional current, said means being connected to said transmission line in such a manner that uni-directional pulsations of different phase are transmitted over different outgoing conductors, and means at the receiving end of said transmission line for selectively combining said uni-directional pulsations and inverting them into poly-phase alternating current of the same frequency as said source.

16. The method of transmitting electrical energy which includes splitting an alternating current wave into separate uni-directional parts, transmitting each part of the split wave over different paths, and uniting said parts after transmission into a single alternating current wave for distribution.

ALBERT R. LOCKE.